(12) United States Patent
Shak

(10) Patent No.: US 6,429,378 B2
(45) Date of Patent: Aug. 6, 2002

(54) LEAD-IN CLAMP WITH ELECTRIC WIRE PROTECTIVE CASING

(75) Inventor: Man Huang Shak, Shenzhen (CN)

(73) Assignee: Majorank International Limited, Kowloon (HK)

( * ) Notice: Subject to any disclaimer, the term of this patent is extended or adjusted under 35 U.S.C. 154(b) by 0 days.

(21) Appl. No.: 09/846,248

(22) Filed: May 2, 2001

(30) Foreign Application Priority Data

May 10, 2000 (CN) .......................................... 00232918 U

(51) Int. Cl.[7] .............................. H01B 7/00; B25B 27/00
(52) U.S. Cl. ...................... 174/135; 174/68.3; 29/270; 81/3.7; 138/128; 138/151
(58) Field of Search ......................... 174/68.3, 72 A, 174/98, 135; 29/270; 81/3.7; 138/128, 151

(56) References Cited

U.S. PATENT DOCUMENTS

| | | | | |
|---|---|---|---|---|
| 1,435,311 A | * | 11/1922 | Knight | 138/110 |
| 2,423,010 A | * | 6/1947 | Dougherty | 29/270 |
| 3,038,558 A | * | 6/1962 | Plummer | 184/16 |
| 3,080,892 A | * | 3/1963 | Plummer | 138/128 |
| 3,092,530 A | * | 6/1963 | Plummer | 138/151 |
| 3,517,702 A | * | 6/1970 | Mueller et al. | 138/128 |
| 4,064,359 A | * | 12/1977 | Peterson et al. | 174/107 |
| 6,202,272 B1 | * | 3/2001 | Jackson | 29/235 |
| 6,219,907 B1 | * | 4/2001 | Frye | 29/825 |
| 6,323,425 B1 | * | 11/2001 | Hegler et al. | 174/68.3 |

FOREIGN PATENT DOCUMENTS

| | | |
|---|---|---|
| JP | 0201044 A2 | 7/1998 |
| WO | WO 00/36722 | 6/2000 |

* cited by examiner

Primary Examiner—Chau N. Nguyen
Assistant Examiner—Adolfo Nino
(74) Attorney, Agent, or Firm—Rabin & Berdo, P.C.

(57) ABSTRACT

A lead-in clamp with electric wire protective casing are disclosed. The electric wire protective casing is a long plastic roll tube, whose longitudinal free edges are not sealed, but rather can be expanded out and drawn back, on the roll tube there being formed a series of uniformly spaced transverse recesses. The lead-in clamp comprises left and right clamp stems, left and right clamp bodies and a clamping spring. When the left and right clamp bodies are fitted together, a wire passing cylinder and a casing guiding head are formed. When in use, the wires are put into the wire passing cylinder, then insert the casing guiding head into one end of the wire protective casing tube. After the wire protective casing tube is fixed stationary by hand, the lead-in clamp is pushed toward the other end of the wire protective casing, thereby to encase all of the wires into the wire protection casing.

4 Claims, 3 Drawing Sheets

LEAD-IN CLAMP WITH ELECTRIC WIRE PROTECTIVE CASING

FIELD OF THE INVENTION

The present invention relates to the protection of electric wires, in particular, to an electric wire protective casing and a lead-in clamp to lead the electric wire into the protective casing.

BACKGROUND OF THE INVENTION

With the development of science and technology, especially the rapid development of the information industry, computers, telephones and facsimiles are now in common use in offices, laboratories or even in households. A lot of electric wires often pass through among such devices as the computer hardware, printer, telephone, facsimile, duplicator and socket outlets, making them appear to be in a muddle, and unpleasant to see. If all these wires should be orderly encased in a protective casing, they would be not only neat and tidy, but also safe and durable. Formerly, in order to be neat and tidy, these wires were usually sheathed or encased in metallic or plastic pipes. When permanently fixed wires are encased in such a way as above, or even pipes containing the wires therein are embedded into the preset groove in the wall or under the floor, it does look neat and tidy, but the installation process is complex and laborious. Moreover, it does not meet the requirement of changes day after day.

The object of the present invention is to overcome the above-mentioned difficulty by providing a lead-in clamp and an electric wire protective casing. By means of the lead-in clamp, the disorderly and confused wires can be conveniently, rapidly, systematically and integrally encased into the wire protective casing to make them neat and tidy, safe and durable.

SUMMARY OF THE INVENTION

The object of the present invention can be thus achieved, namely, an electric wire protective casing is provided, which is a long plastic roll tube, whose longitudinal free edges are not sealed, but rather can be expanded out and drawn back. On the roll tube there are formed a series of uniformly spaced, transverse recesses to make the protective casing more freely bendable. The transverse recesses comprise rectangular recesses which are not open to the free edges and notches which are open to the free edges, alternately distributed over the wall of the plastic roll tube. The lead-in clamp, which is to lead wires into the wire protective casing, comprises left and right clamp stems, left and right clamp bodies and a clamping spring. Its features lie in that when the left and right clamp bodies are fitted together, the wire passing cylinder and the casing guiding head are formed.

On the figures:
1—wire protective casing
2—lead in clamp
11—free edge
12—free edge
13—rectangular recesses
14—notch
15—roll tube
21—left half clamp body
22—right half clamp body
23—mouth shaped dent
24—clamping spring
25—long and narrow through hole
26—left clamp stem
27—right clamp stem
28—wire passing cylinder
29—casing guiding head

DETAILED DESCRIPTION OF THE INVENTION

The following is a further description of the present invention incorporating a preferred embodiment and the accompanying drawings.

Figure 1:
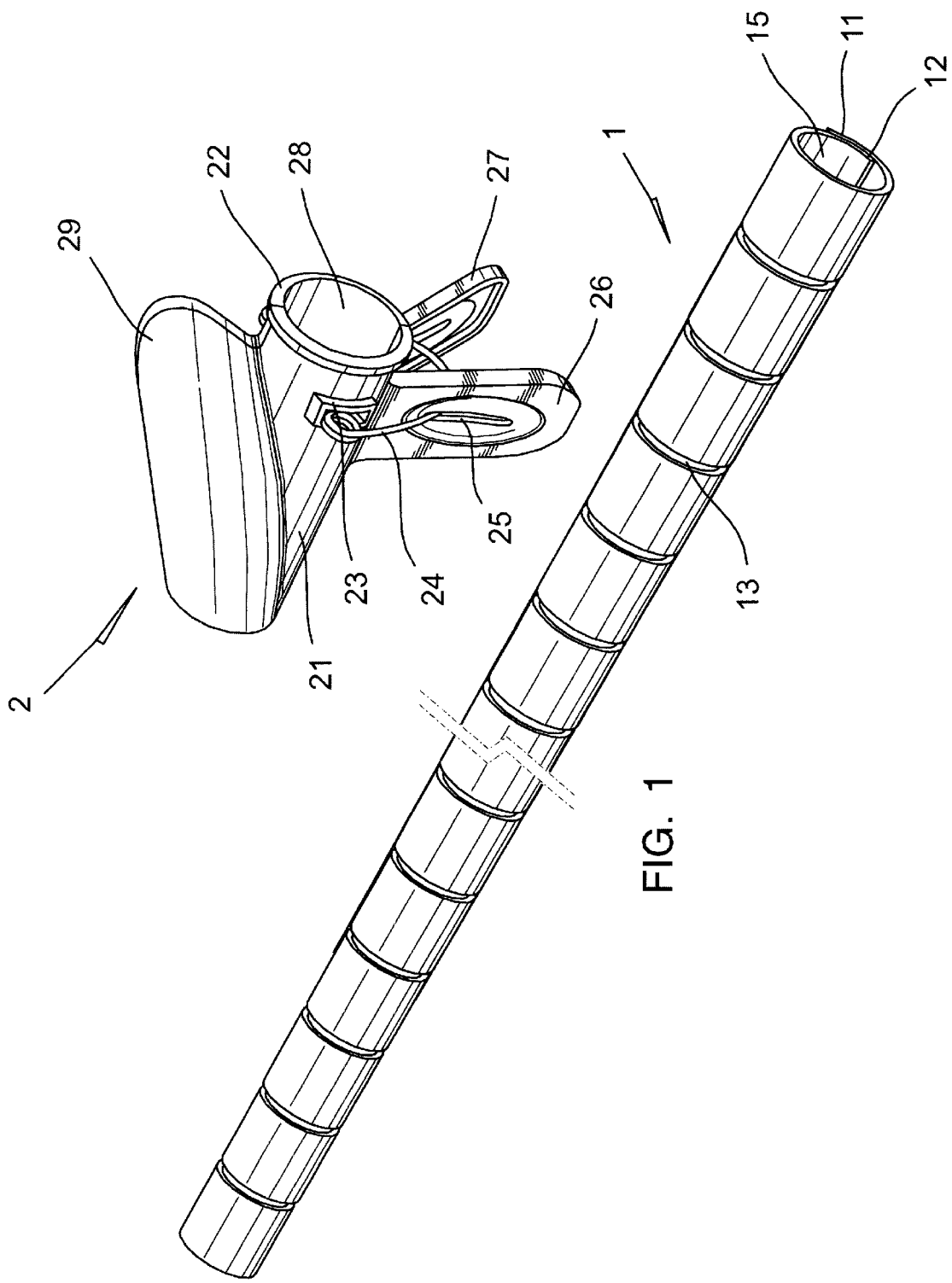
FIG. 1 is a schematic diagram of the lead-in clamp and the wire protective casing of the present invention.
Figure 2:
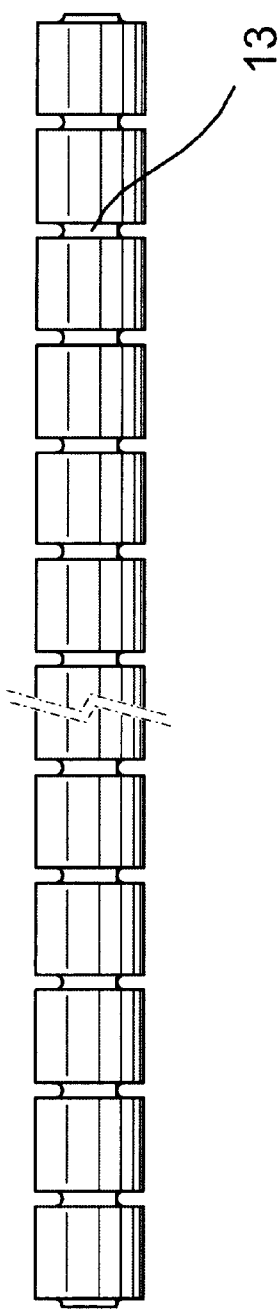
FIG. 2 is a front view of the wire protective casing of the present invention.
Figure 3:
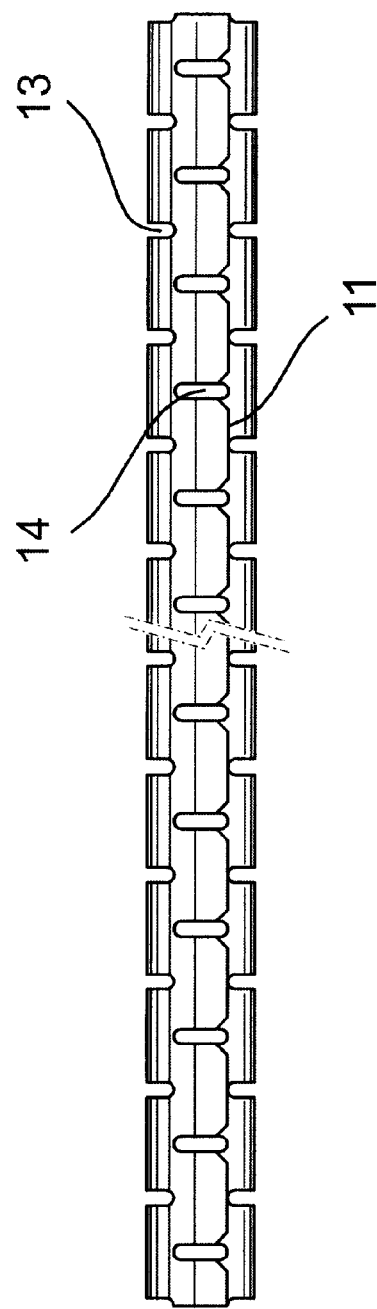
FIG. 3 is a rear view of the wire protective casing of the present invention.

FIG. 1 is a schematic diagram of a preferred embodiment of the present invention, the lower part being the wire protective casing 1. As shown in FIG. 2 and FIG. 3, the wire protective casing 1 of the present utility model is a long plastic tube, the free edges 11, 12 of which can be freely rolled, either expanded out or drawn back. On the roll tube there are formed, uniformly spaced, a series of transverse recesses. These recesses comprise rectangular recesses 13 which are not open to the free edges and notches 14 which are open to the free edges. The recesses 13 and notches 14 are alternately distributed over the plastic roll tube 15, so that the plastic roll tube can be conveniently and freely bent according to requirement.

The upper part of FIG. 1 is a schematic diagram of the lead-in clamp 2. It comprises left and right clamp stems 26, 27, left and right clamp bodies 21, 22 and a clamping spring 24. Its features lie in that when the left clamp body 21 and right clamp body 22 are fitted together by the clamping force of the clamping spring 24, a wire passing cylinder 28 and a casing guiding head 29 are formed.

Figure 4:
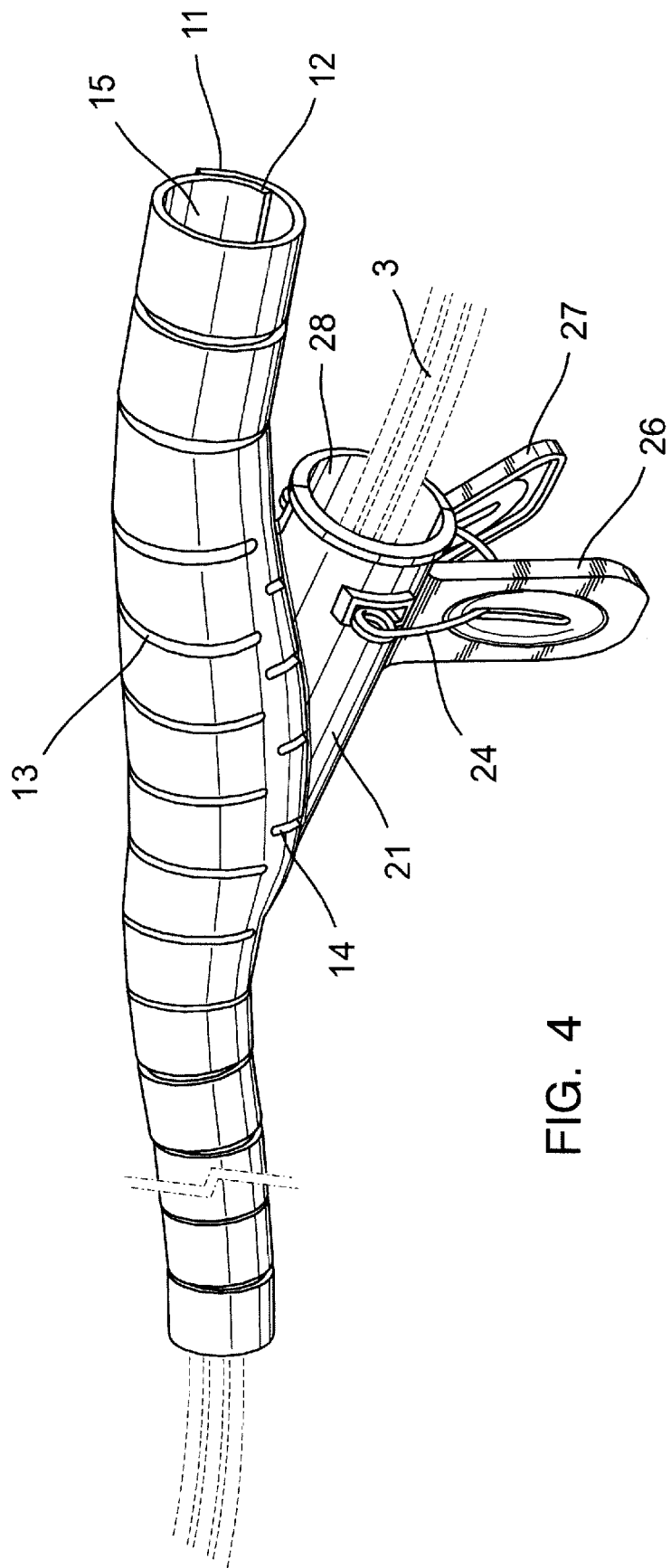
FIG. 4 is an operating diagrammatic view showing how wires are encased into the wire protective casing of the present invention by means of the lead-in clamp of the present invention.

When in use, first grasp with force the clamp stems 26 and 27 to open the clamp bodies 21, 22, then put the wires to be encased into the wire passing cylinder 28 of the clamp. After the loosening of the grip, the clamp bodies 21, 22 are fitted together by the clamping force of the clamping spring 24. Then insert the casing guiding head 29 into one end of the wire protective casing tube (as shown in FIG. 4), and grasp the wire protective casing tube. Then, the lead-in clamp is pushed toward the other end of the wire protective casing tube until the full length of all the wire has been encased in the wire protective easing tube.

The wire protective casing tube has freely expanding and contracting functions. A plurality of wires can be smoothly encased in the wire protective casing tube by means of the lead-in clamp. Lead-in clamp 2 and wire protective casing tube 1 of different sizes (here mainly referring to the natural diameter of the roll tube and that of the wire passing cylinder, that is, the diameters when no expanding force is applied) can be produced to meet the requirements of varied plurality of wires.

Consequently, it is quite evident that disorderly and unsystematic wires can be conveniently, rapidly, systematically and integrally encased in the wire protective casing by means of the lead-in clamp based on the present invention to make them neat and tidy, safe and durable, thus achieving the object of the invention.

What is claimed is:

1. A lead-in clamp with electric wire protective casing, the wire protective casing being a long plastic roll tube, whose longitudinal free edges are not sealed, but which are expandable out and drawn back, on the roll tube there being formed a series of uniformly spaced transverse recesses to make the protective casing tube more freely bendable, the transverse recesses comprising rectangular recesses which are not open to the free edges and notches which are open to the free edges, the rectangular recesses and the notches being alternately distributed over the wall of said plastic roll tube.

2. The lead-in clamp with electric wire protective casing according to claim 1, wherein the lead-in clamp comprises left and right clamp stems, left and right clamp bodies and a clamping spring, wherein when said left and right clamp bodies are fitted together, a wire passing cylinder and a casing guiding head are formed.

3. A lead-in clamp for use with an electric wire protective casing, comprising left and right clamp stems, left and right clamp bodies and a clamping spring, wherein when said left and right clamp bodies are fitted together, a wire passing cylinder and a casing guiding head are formed.

4. A lead-in clamp with electric wire protective casing, the wire protective casing being a long plastic roll tube, whose longitudinal free edges are not sealed, but which are expandable out and drawn back, on the roll tube there being formed a series of uniformly spaced transverse recesses to make the protective casing tube more freely bendable, the lead-in clamp comprising left and right clamp stems, left and right clamp bodies and a clamping spring, wherein when said left and right clamp bodies are fitted together, a wire passing cylinder and a casing guiding head are formed.

* * * * *